United States Patent
Ishikawa et al.

(10) Patent No.: US 8,473,169 B2
(45) Date of Patent: Jun. 25, 2013

(54) VEHICLE TRANSMISSION CONTROL APPARATUS

(75) Inventors: Yutaka Ishikawa, Wako (JP); Yasuhiro Gokan, Wako (JP); Osahide Miyamoto, Wako (JP); Yoshiharu Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 478 days.

(21) Appl. No.: 12/850,634

(22) Filed: Aug. 5, 2010

(65) Prior Publication Data

US 2011/0035127 A1 Feb. 10, 2011

(30) Foreign Application Priority Data

Aug. 5, 2009 (JP) ................. 2009-182208

(51) Int. Cl.
*G06F 7/00* (2006.01)
*G06F 17/00* (2006.01)
*G06F 19/00* (2011.01)

(52) U.S. Cl.
USPC ............................................. 701/51; 701/65

(58) Field of Classification Search
None
See application file for complete search history.

(56) References Cited

U.S. PATENT DOCUMENTS

| 5,389,050 A * | 2/1995 | Sakai et al. ................. 701/57 |
| 5,484,350 A | 1/1996 | Ishikawa et al. |
| 5,598,825 A * | 2/1997 | Neumann ................. 123/478 |
| 2008/0229816 A1 * | 9/2008 | Konrad et al. ............. 73/114.37 |

FOREIGN PATENT DOCUMENTS

| JP | 07-71588 | 3/1995 |
| JP | 2959937 B2 | 3/1995 |
| JP | 2002-021999 | 1/2002 |

OTHER PUBLICATIONS

Japanese Office Action for corresponding JP Application No. 2010-167243, Aug. 3, 2012.

\* cited by examiner

*Primary Examiner* — Paul Danneman
(74) *Attorney, Agent, or Firm* — Ditthavong Mori & Steiner, P.C.

(57) ABSTRACT

A vehicle transmission control apparatus includes an expected-acceleration calculator configured to calculate an expected acceleration of a vehicle based on at least an engine load and a vehicle speed. An actual-acceleration calculator is configured to calculate an actual acceleration of the vehicle. An uphill determination device is configured to calculate an uphill determination value based on a difference between the expected acceleration and the actual acceleration and configured to calculate a corrected uphill determination value by subjecting the uphill determination value to moderating calculation using a moderating coefficient and to update the corrected uphill determination value in accordance with the moderating coefficient. A transmission-characteristic selecting device is configured to select one of transmission characteristics based on the corrected uphill determination value. A transmission controller is configured to perform transmission control based on the transmission characteristic selected by the transmission-characteristic selecting device.

4 Claims, 9 Drawing Sheets

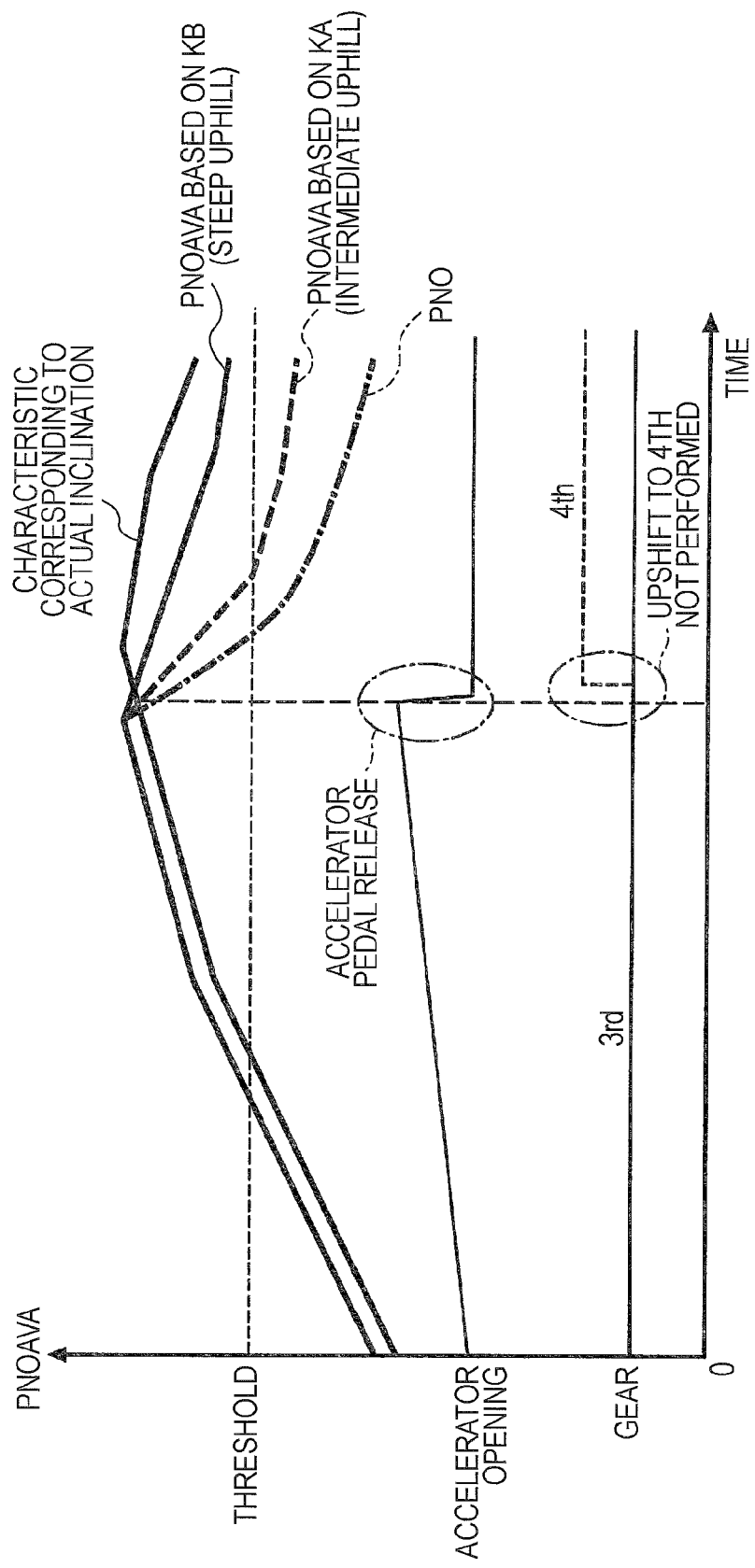

VEHICLE TRANSMISSION CONTROL APPARATUS

CROSS REFERENCES TO RELATED APPLICATIONS

The present application relates to Japanese Patent Application No. 2009-182208, filed Aug. 5, 2009, entitled "Vehicle Transmission Control Apparatus." The contents of this application are incorporated herein by reference in their entirety.

BACKGROUND OF THE INVENTION

1. Field of the Invention

The present invention relates to a vehicle transmission control apparatus.

2. Description of the Related Art

Such a vehicle transmission control apparatus is disclosed in, for example, Japanese Patent No. 2959937.

In this transmission control apparatus, a shift map corresponding to the inclination of an uphill is selected on the basis of the uphill determination value calculated on the basis of a difference between an expected acceleration and an actual acceleration. The transmission control apparatus performs a shift-changing operation in accordance with the selected shift map. Therefore, the risk of occurrence of a shift-busy state, in which upshifting and downshifting repeatedly occur while a vehicle climbs an uphill, thereby causing the driver to experience an uncomfortable feeling, can be reduced.

In the above-described transmission control apparatus according to the related art, in the case where a vehicle climbs an uphill while towing a heavy object, such as a trailer, the uphill determination value suddenly decreases if the driver releases an accelerator pedal, as will be described in more detail below in the Description of the Preferred Embodiments section. Therefore, even when a shift map for a steep uphill is to be selected, a shift map for a gentler uphill may be selected instead. In such a case, there is a possibility that the undesirable shift-busy state will occur.

SUMMARY OF THE INVENTION

According to one aspect of the present invention, a vehicle transmission control apparatus includes an expected-acceleration calculator, an actual-acceleration calculator, an uphill determination device, a transmission-characteristic selecting device, and a transmission controller. The expected-acceleration calculator is configured to calculate an expected acceleration of a vehicle based on at least an engine load and a vehicle speed. The actual-acceleration calculator is configured to calculate an actual acceleration of the vehicle. The uphill determination device is configured to calculate an uphill determination value based on a difference between the expected acceleration and the actual acceleration. The uphill determination device is configured to calculate a corrected uphill determination value by subjecting the uphill determination value to moderating calculation using a moderating coefficient and to update the corrected uphill determination value in accordance with the moderating coefficient. The uphill determination value serves as an index for determining whether or not the vehicle is climbing an uphill. The transmission-characteristic selecting device is configured to select one of a plurality of transmission characteristics based on the corrected uphill determination value. The transmission characteristics include at least a transmission characteristic for climbing an uphill and a transmission characteristic for driving on a flat road. The transmission controller is configured to perform transmission control based on the transmission characteristic selected by the transmission-characteristic selecting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a time chart illustrating an example of the operation.

DESCRIPTION OF THE EMBODIMENTS

An embodiment of the present invention will be described with reference to FIGS. 1 to 9.

Figure 1:
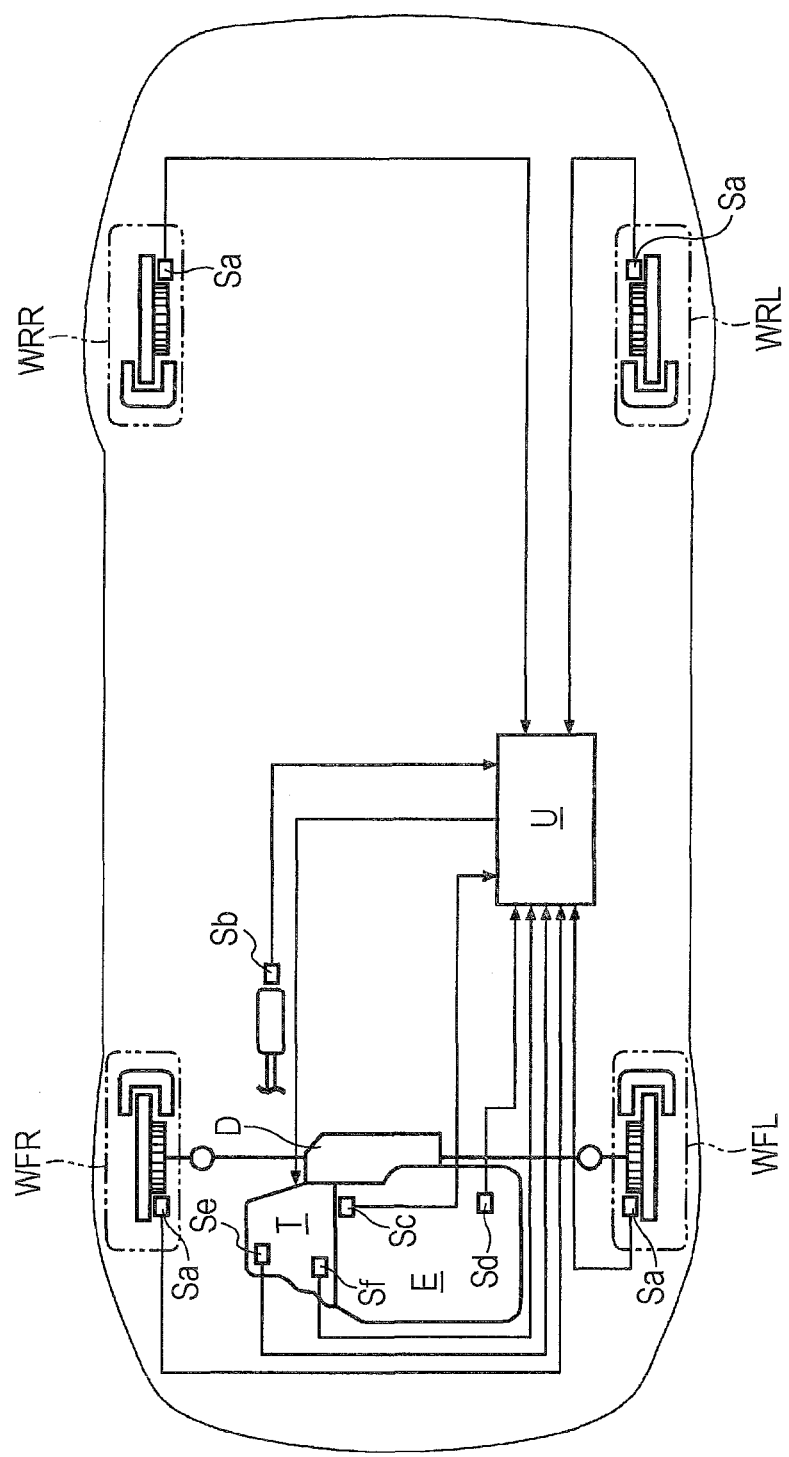
FIG. 1 is a diagram illustrating the overall structure of a vehicle including a transmission control apparatus.

As shown in FIG. 1, a vehicle including a transmission control apparatus according to the present embodiment includes driving wheels, which are left and right front wheels WFL and WFR, and driven wheels, which are left and right rear wheels WRL and WRR. A driving force of an engine E is transmitted to the left and right front wheels WFL and WFR through a transmission T and a differential gear D. An electronic control unit U, which controls a shift-changing operation of the transmission T, is connected to wheel speed sensors Sa that detect wheel speeds of the left and right front wheels WFL and WFR and the left and right rear wheels WRL and WRR; an accelerator opening sensor Sb that detects an accelerator opening; an engine rotational speed sensor Sc that detects a rotational speed of the engine E; a negative suction pressure sensor Sd that detects a negative suction pressure of the engine E; a transmission-input-shaft rotational speed sensor Se that detects a rotational speed of an input shaft of the transmission T; and a transmission-output-shaft rotational speed sensor Sf that detects a rotational speed of an output shaft of the transmission T. The electronic control unit U controls the shift-changing operation of the transmission T on the basis of signals obtained from the above-mentioned sensors Sa, Sb, Sc, Sd, Se, and Sf.

Figure 2:
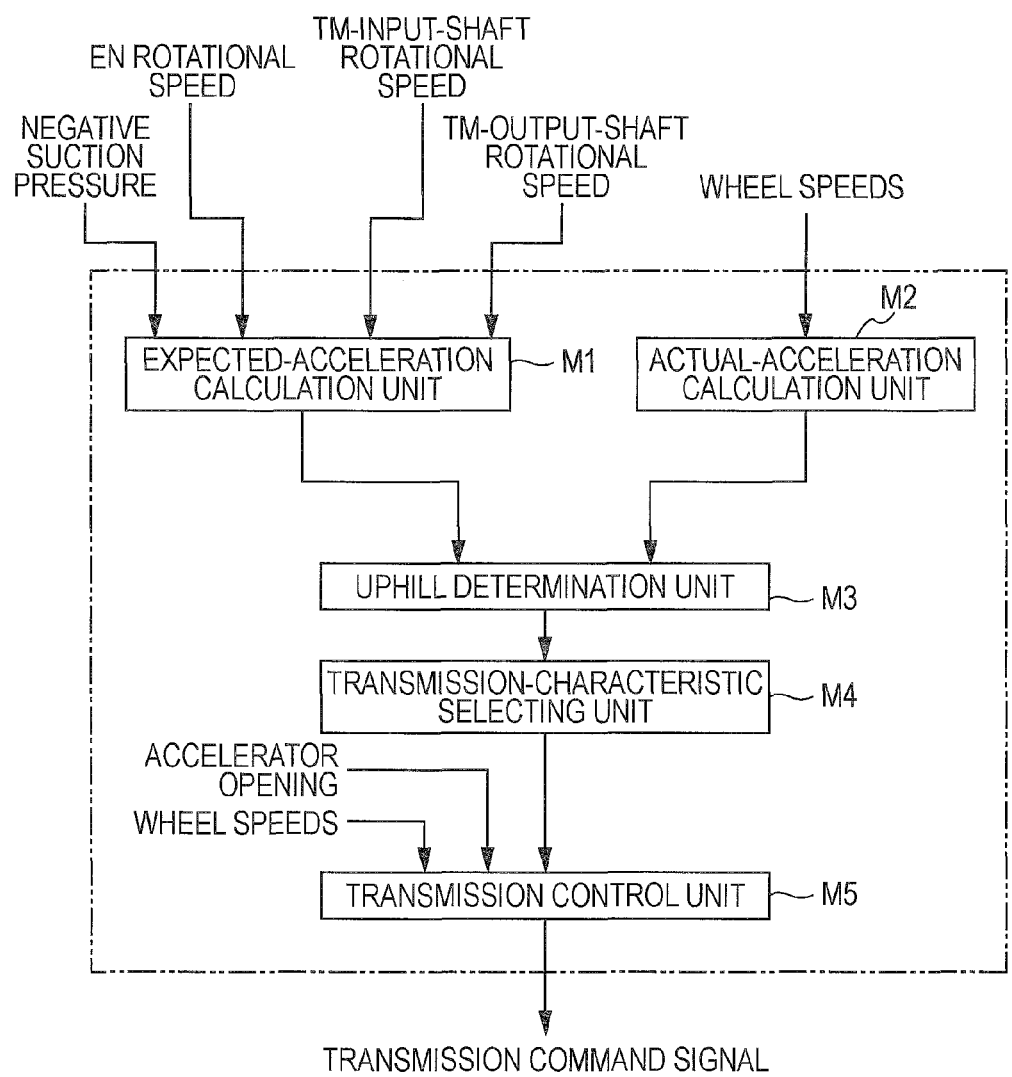
FIG. 2 is a block diagram of an electronic control unit included in the transmission control apparatus.

As shown in FIG. 2, the electronic control unit U includes an expected-acceleration calculator M1, an actual-acceleration calculator M2, an uphill determination device M3, a transmission-characteristic selecting device M4, and a transmission controller M5. The expected-acceleration calculator M1 receives the negative suction pressure detected by the negative suction pressure sensor Sd and the engine rotational speed detected by the engine rotational speed sensor Sc. The actual-acceleration calculator M2 receives the wheel speeds detected by the wheel speed sensors Sa. The transmission controller M5 receives the accelerator opening detected by the accelerator opening sensor Sb and the wheel speeds detected by the wheel speed sensors Sa. The transmission controller M5 outputs a transmission control signal to the transmission T.

Figure 3:
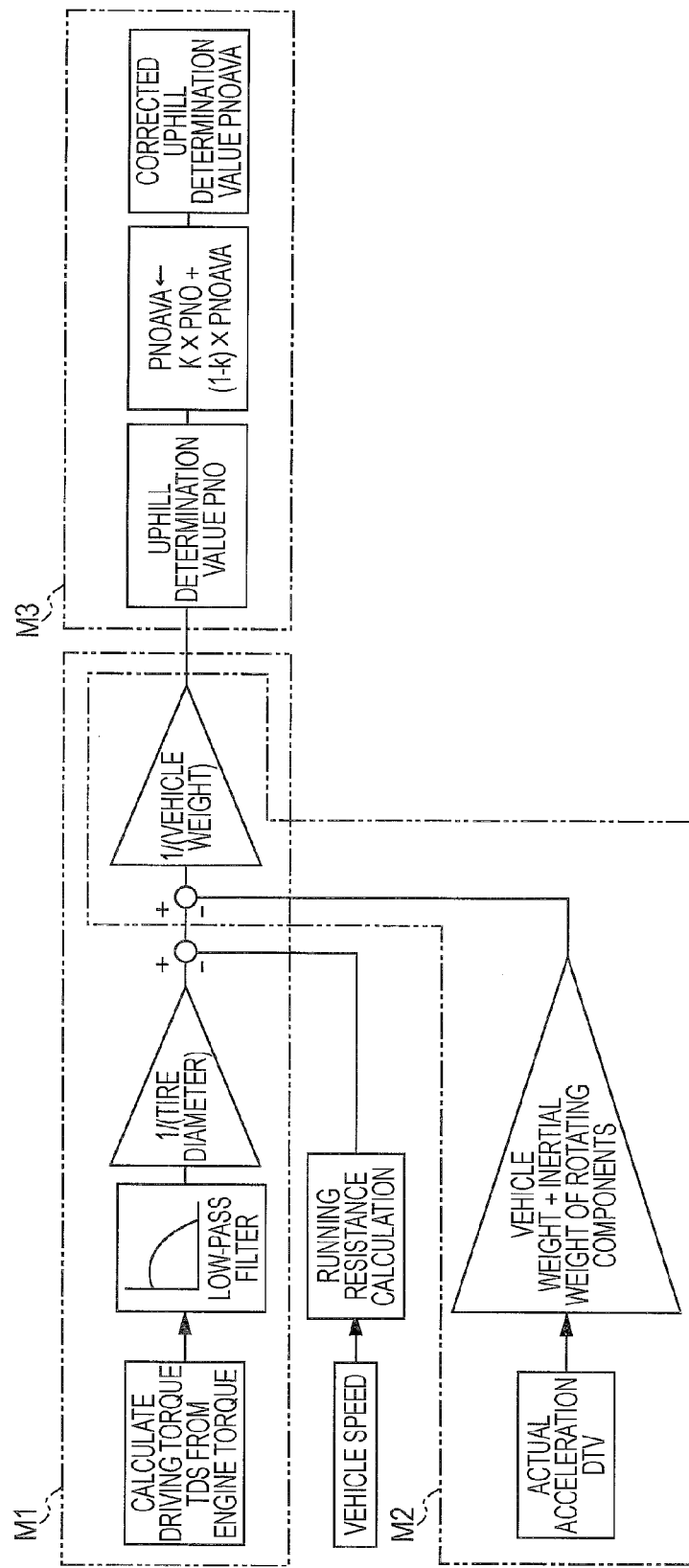
FIG. 3 is a diagram illustrating a process of calculation of a corrected uphill determination value.

As shown in FIG. 3, the expected-acceleration calculator M1 calculates a driving torque TDS of the vehicle on the basis of an engine torque calculated from the engine rotational speed and the negative suction pressure and a gear ratio of the transmission gears calculated from the transmission-input-shaft rotational speed and the transmission-output-shaft rotational speed. The driving torque TDS is filtered by a low-pass filter to eliminate high-frequency noise components, and the driving torque TDS is then divided by a tire diameter to obtain a driving force of the vehicle. In addition, a running resistance applied to the vehicle is calculated on the basis of a vehicle speed determined from the wheel speed of each wheel (for example, the average of the wheel speeds of the four wheels), and an estimated driving force is determined by subtracting the running resistance from the obtained driving force. The estimated driving force corresponds to an expected acceleration in the case where the vehicle drives on a flat road with a load corresponding to the standard carrying capacity (for example, a load applied when two people are on board).

The actual-acceleration calculator M2 calculates the actual acceleration DTV of the vehicle by differentiating the vehicle speed based on the wheel speeds of the four wheels with respect to time. Then, a value corresponding to the actual acceleration of the vehicle is calculated by multiplying the actual acceleration DTV by the sum of the vehicle weight and the inertial weight of rotating components. Then, the uphill determination device M3 calculates an uphill determination value PNO by subtracting the value corresponding to the actual acceleration from the value corresponding to the expected acceleration and dividing the result of the subtraction by the vehicle weight. The uphill determination value PNO is a value corresponding to the difference between the expected acceleration and the actual acceleration.

The expected acceleration is calculated on the assumption that the vehicle is driving on a flat road with a load corresponding to the standard carrying capacity. Therefore, the expected acceleration does not change even when the vehicle is climbing an uphill or when the vehicle is driving with a load that exceeds the standard carrying capacity (for example, when the vehicle is towing a trailer). However, since the actual acceleration is an acceleration that is actually generated, the value of the actual acceleration decreases when the vehicle is climbing an uphill or is driving with a load that exceeds the standard carrying capacity. Therefore, the uphill determination value PNO, which corresponds to the difference between the expected acceleration and the actual acceleration, increases as the climbing angle or the load increases. Therefore, the load with which the vehicle is driving can be determined on the basis of the uphill determination value PNO.

Figure 4:
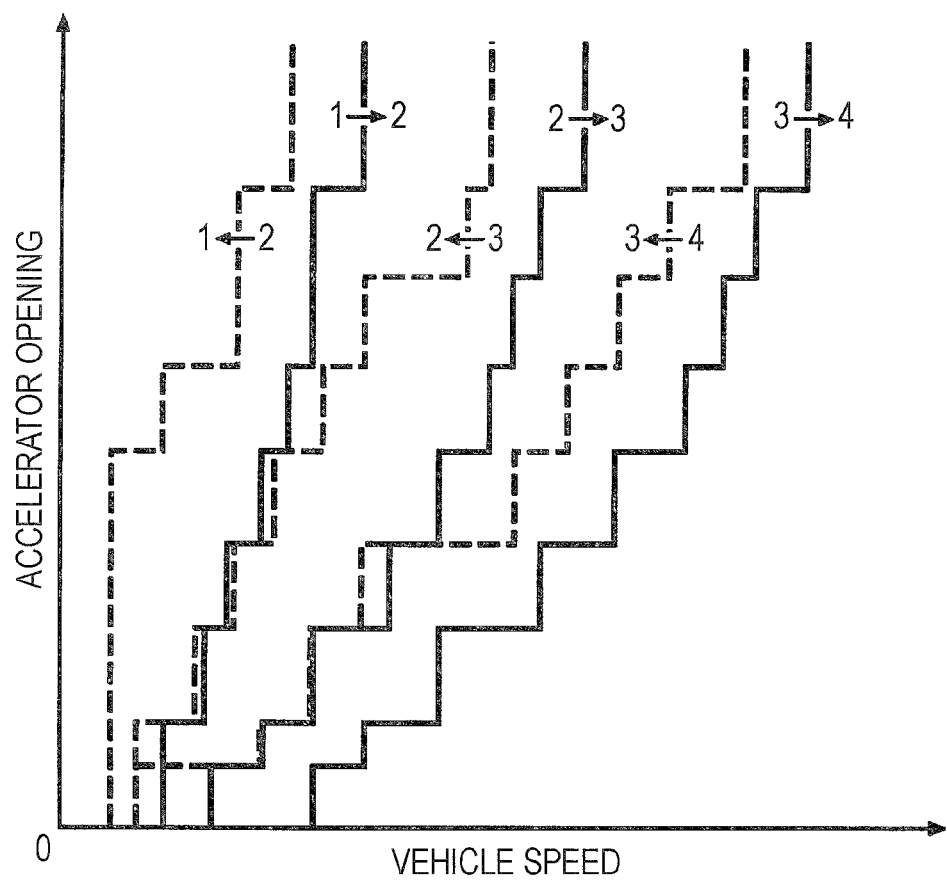
FIG. 4 is a diagram illustrating an example of a shift map.
Figure 5:
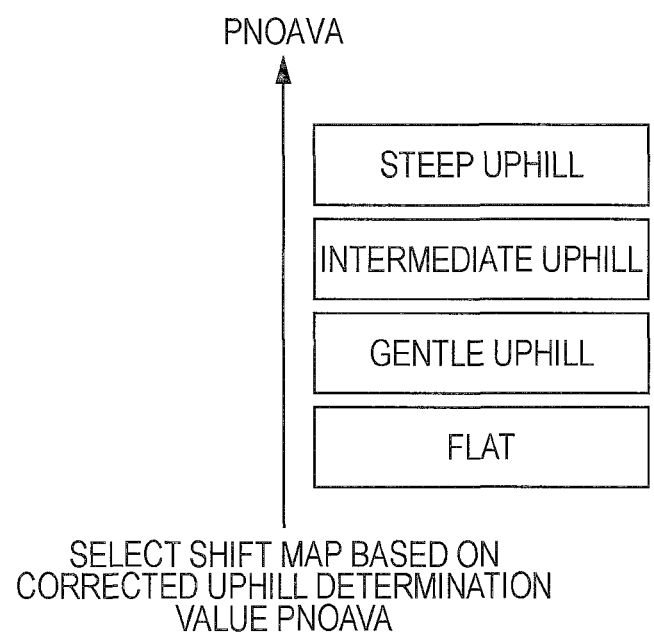
FIG. 5 is a diagram illustrating the types of shift maps selected in accordance with the corrected uphill determination value.

To control the shift-changing operation of the transmission T, a shift map shown in FIG. 4, for example, is used. Parameters of the shift map include the accelerator opening and the vehicle speed. In accordance with the shift map, upshifting is performed when the point defined by the accelerator opening and the vehicle speed crosses one of shift-change lines for upshifting from left to right or downward, and downshifting is performed when the point defined by the accelerator opening and the vehicle speed crosses one of shift-change lines for downshifting from right to left or upward.

The shift-change lines in the shift map are set on the assumption that the vehicle is driving on a flat road. Therefore, if the shift map for a flat road is used when the vehicle is climbing an uphill, there is a possibility that the acceleration performance will be reduced or frequent shift changes (shift-busy state) will occur.

Therefore, the transmission-characteristic selecting device M4 selects one of shift maps for a flat road, a gentle uphill, an intermediate uphill, and a steep uphill in accordance with a climbing state determined by the uphill determination device M3 (see FIG. 2). Then, the transmission controller M5 outputs a transmission command signal to the transmission T on the basis of the selected shift map.

However, in the case where, for example, the vehicle climbs an uphill while towing a trailer, it is difficult to avoid the shift-busy state simply by changing the shift-map for a flat road to the shift map for an uphill. The reason for this will now be described.

Figure 6:
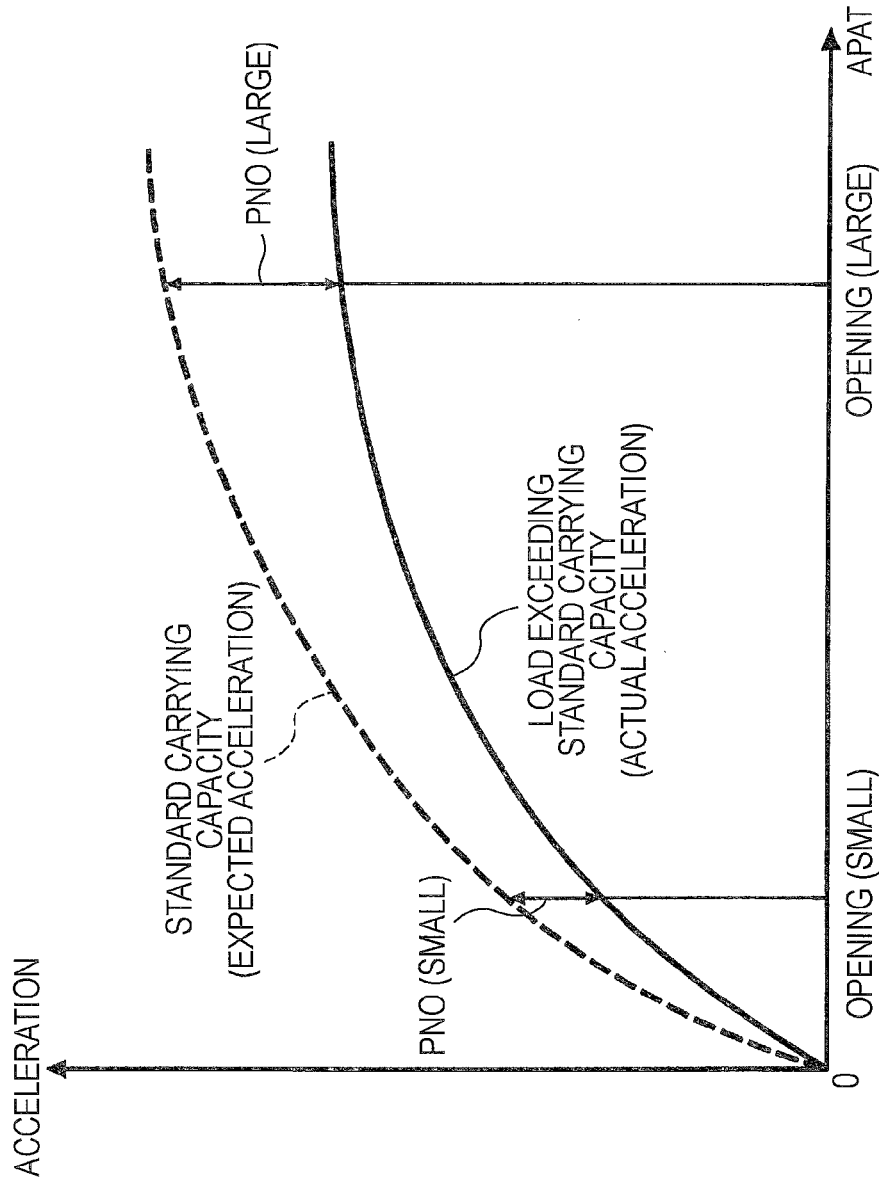
FIG. 6 is a diagram illustrating the relationship between the accelerator opening and the acceleration, which varies in accordance with the load.

FIG. 6 shows the relationship between the accelerator opening and the acceleration of the vehicle. The broken line shows the case in which the vehicle drives with a load corresponding to the standard carrying capacity. The solid line shows the case in which the vehicle tows, for example, a trailer and drives with a load that exceeds the standard carrying capacity. If the accelerator opening is constant, the acceleration generated when the load corresponds to the standard carrying capacity is, of course, larger than the acceleration generated when the load exceeds the standard carrying capacity. Even in the case where the vehicle drives with a load that exceeds the standard carrying capacity, the expected acceleration used to calculate the uphill determination value PNO has the characteristic shown by the broken line in FIG. 6, since it is assumed that the vehicle is driving with a load corresponding to the standard carrying capacity. However, in practice, the actual acceleration is smaller than the expected acceleration, and has the characteristic shown by the solid line. The difference between the expected acceleration and the actual acceleration corresponds to the uphill determination value PNO.

As is clear from FIG. 6, as the accelerator opening decreases, the uphill determination value PNO also decreases. As a result, it will be incorrectly determined that the inclination of the uphill is smaller than the actual inclination. Therefore, there is a risk that an uphill which would be determined as a steep uphill when the load corresponds to the standard carrying capacity will be determined as an intermediate uphill or a gentle uphill when the load exceeds the standard carrying capacity. In such a case, the transmission-characteristic selecting device M4 will select an unsuitable shift map.

Figure 7:
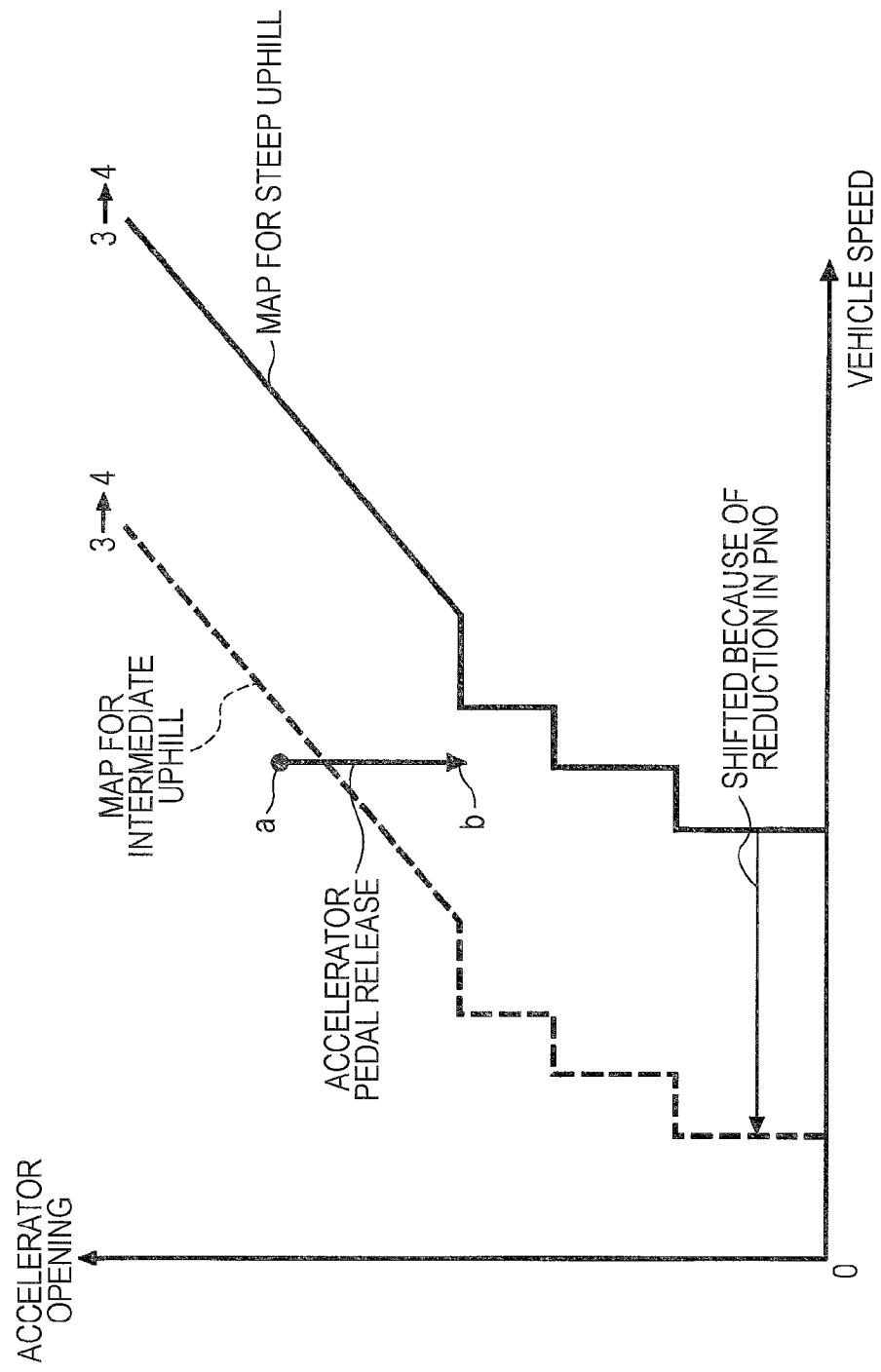
FIG. 7 is a diagram illustrating the reason why a shift-busy state occurs.

FIG. 7 illustrates upshifting lines for upshifting from the 3rd gear to the 4th gear. The solid line shows an upshifting line for a steep uphill and the broken line shows an upshifting line for an intermediate uphill. As described above with reference to FIG. 6, the uphill determination value PNO decreases in an area where the accelerator opening is small. Therefore, there may be a case in which the shift map for an intermediate uphill will be selected although the shift map for a steep uphill is to be selected. In the shift map for an intermediate uphill, the upshifting line for upshifting from the 3rd gear to the 4th gear is displaced leftward (toward the low-vehicle-speed side) from that in the shift map for a steep uphill. Therefore, when the driver slightly releases the accelerator pedal and the accelerator opening changes, for example, from point a to point b, upshifting will be carried out according to the shift map for an intermediate uphill although no upshifting will be carried out according to the shift map for a steep uphill.

In other words, in the case where the vehicle drives with a load that exceeds the standard carrying capacity, for example, in the case where the vehicle drives while towing a trailer, even when a shift map for an uphill with a large inclination is to be selected, a shift map for an uphill with a smaller inclination may be selected as a result of a reduction in the uphill determination value PNO. Therefore, there is a possibility that upshifting will be carried out in response to only a slight release of the accelerator pedal and then the shift-busy state will occur in which downshifting and upshifting are alternately carried out. As a result, the driver experiences an uncomfortable feeling.

To prevent such a situation, according to the present embodiment, the uphill determination device M3 uses a corrected uphill determination value PNOAVA, which is obtained by subjecting the uphill determination value PNO to a moderating calculation. Therefore, even when the uphill determination value PNO is reduced in the case where the vehicle drives with a load that exceeds the standard carrying capacity, a shift map for an uphill with a small inclination is not easily selected and the above-described shift-busy state can be prevented.

Figure 8:
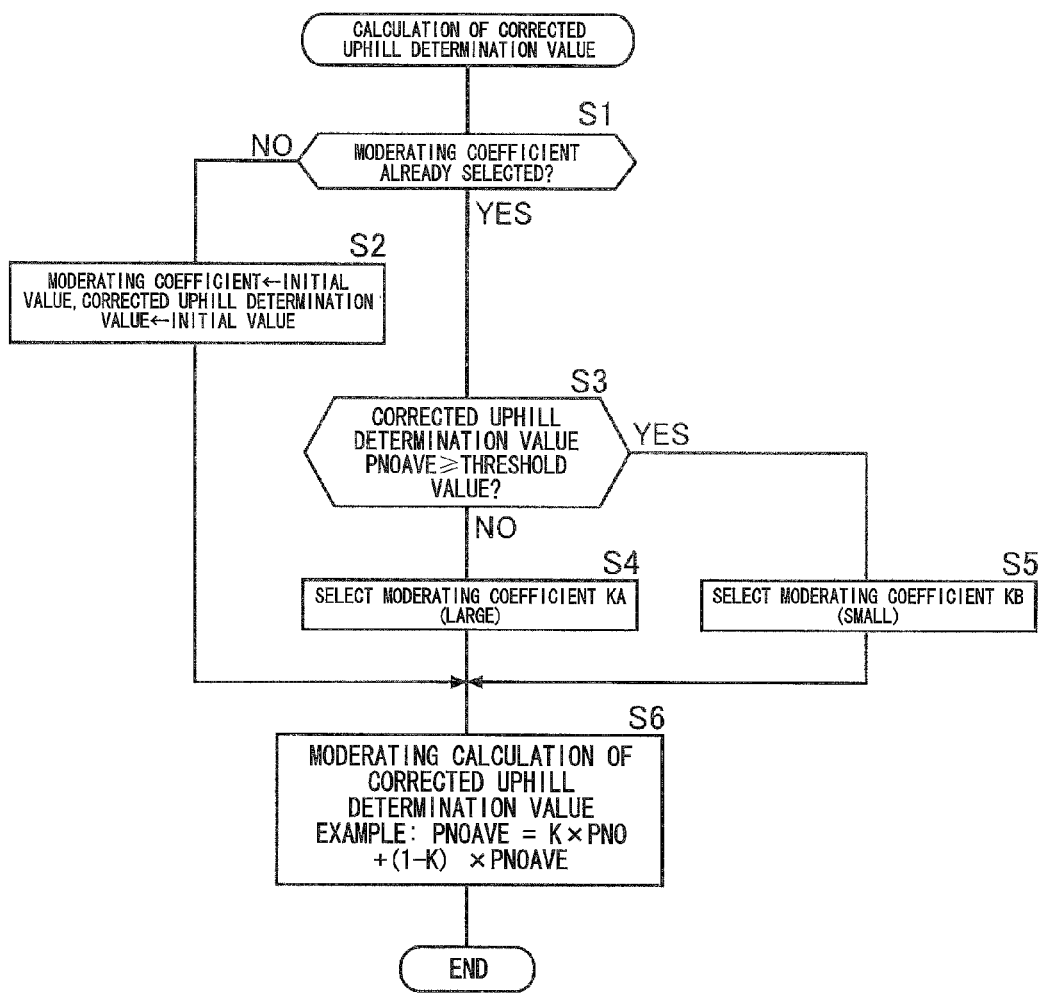
FIG. 8 is a flowchart illustrating a process of a moderating calculation.

FIG. 8 is a flowchart illustrating the method for calculating the corrected uphill determination value PNOAVA. In step S1, it is determined whether or not a moderating coefficient K is already selected. Since the moderating coefficient K is not selected yet in the first loop, in step S2 the moderating coefficient K is set to its initial value and the corrected uphill determination value PNOAVA is set to its initial value. Then in step S6, the current value of the corrected uphill determination value PNOAVA is calculated from the uphill determination value PNO, the initial value of the moderating coefficient K, and the initial value of the corrected uphill determination value PNOAVA as follows:

$$PNOAVA \leftarrow K \times PNO + (1-k) \times PNOAVA$$

In the second loop and later, the answer to the question in step S1 is "YES," and therefore the process proceeds to step S3. If in step S3 the corrected uphill determination value PNOAVA is lower than the threshold and the possibility that the vehicle is driving with a load that exceeds the standard carrying capacity is low, then a moderating coefficient KA is selected in step S4. If it is determined in step 3 that the corrected uphill determination value PNOAVA is higher than or equal to the threshold and the possibility that the vehicle is driving with a load that exceeds the standard carrying capacity is high, then a moderating coefficient KB is selected in step S5. The moderating coefficients KA and KB are larger than 0 and smaller than 1, and KB<KA is satisfied.

Then, in step S6, the current value of the corrected uphill determination value PNOAVA is calculated from the uphill determination value PNO and the previous value of the corrected uphill determination value PNOAVA as follows:

$$PNOAVA \leftarrow K \times PNO + (1-K) \times PNOAVA$$

In the above expression, KA or KB is substituted for K.

If the corrected uphill determination value PNOAVA is smaller than the threshold and the possibility that the vehicle is driving with a load that exceeds the standard carrying capacity is low, the larger moderating coefficient KA is selected. Therefore, when the driver releases the accelerator pedal and the uphill determination value PNO decreases, the reduction in the uphill determination value PNO largely affects the corrected uphill determination value PNOAVA and the corrected uphill determination value PNOAVA is largely reduced. If the corrected uphill determination value PNOAVA is larger than or equal to the threshold and the possibility that the vehicle is driving with a load that exceeds the standard carrying capacity is high, the smaller moderating coefficient KB is selected. Therefore, even when the driver releases the accelerator pedal and the uphill determination value PNO decreases, the reduction in the uphill determination value PNO does not largely affect the corrected uphill determination value PNOAVA and the corrected uphill determination value PNOAVA is reduced by a small amount.

In the case where the possibility that the vehicle is driving with a load that exceeds the standard carrying capacity is high, the corrected uphill determination value PNOAVA, which only slightly decreases in response to a release of the accelerator pedal by the driver, is used in place of the uphill determination value PNO, which largely decreases in response to a release of the accelerator pedal by the driver. Then, a shift map corresponding to the corrected uphill determination value PNOAVA is selected. Therefore, even in the case where the shift map for an intermediate uphill is selected according to the related art, the shift map for a steep uphill is continuously selected. As a result, upshifting does not easily occur when the driver releases the accelerator pedal and the occurrence of the shift-busy state can be avoided.

FIG. 9 is a time chart illustrating an example of the above-described control operation. It is assumed, for example, that the corrected uphill determination value PNOAVA has become larger than the threshold while the vehicle is driving in the 3rd gear with a load that exceeds the standard carrying capacity. If the driver releases the accelerator pedal in this state, the uphill determination value PNO suddenly decreases. However, since the smaller moderating coefficient KB is selected, the corrected uphill determination value PNOAVA only slightly decreases. Therefore, the shift map is not changed from the shift map for a steep uphill to the shift map for an intermediate uphill, and the shift map for a steep uphill is continuously selected. As a result, although upshifting to the 4th gear would have been carried out according to the related art, the 3rd gear is continuously selected according to the present embodiment. Thus, the occurrence of the shift-busy state can be suppressed.

As described above, according to the present embodiment, the uphill determination value PNO, which is used for switching the shift map in accordance with the inclination of the uphill, is corrected if it is assumed that the vehicle is driving with a load that exceeds the standard carrying capacity. The uphill determination value PNO is corrected by moderating calculation, and the corrected uphill determination value PNOAVA is obtained as a result. Therefore, even when the driver releases the accelerator pedal and the uphill determination value PNO is largely reduced, an amount of reduction in the corrected uphill determination value PNOAVA can be reduced. Therefore, even when the driver releases the accelerator pedal, the shift map is prevented from being switched from the shift map for a steep uphill to the shift map for a gentler uphill and upshifting does not easily occur. As a result, the occurrence of the shift-busy state can be effectively avoided. In addition, since it is not necessary to use an inclination sensor or a weight sensor, the costs can be prevented from being increased.

The correction of the uphill determination value PNO is performed when the corrected uphill determination value PNOAVA is higher than or equal to the threshold, that is, when the inclination is higher than or equal to a predetermined value. Therefore, the shift-changing operation is not affected when the vehicle is driving on a flat road or a gentle uphill. In addition, since the use of the corrected uphill determination value PNOAVA is limited to a high-load range, the uncomfortable feeling experienced by the driver can be minimized even when there is a slight delay in switching between the shift maps as a result of the moderating calculation.

Although the embodiment of the present invention is described above, the present invention is not limited to the above-described embodiment, and various design changes can be made within the scope of the present invention.

For example, although four shift maps, which are the shift maps for a flat road, a gentle uphill, an intermediate uphill, and a steep uphill, are used in the above-described embodiment, the kinds of the shift maps can be arbitrarily determined.

In addition, the method of moderating calculation to which the uphill determination value PNO is subjected is not limited to first-order moderation as in the present embodiment, and other moderating processes may be used instead.

According to the above-described structure of the vehicle transmission control apparatus according to the embodiment of the present invention, the expected-acceleration calculator calculates the expected acceleration of the vehicle on the basis of at least the engine load and the vehicle speed. The actual-acceleration calculator calculates the actual acceleration of the vehicle. The uphill determination device that calculates the uphill determination value on the basis of the difference between the expected acceleration and the actual acceleration, the uphill determination value serving as the index for determining whether or not the vehicle is climbing an uphill. The transmission-characteristic selecting device selects one of the plurality of transmission characteristics, the transmission characteristics including at least the transmission characteristic for climbing an uphill and the transmission characteristic for driving on a flat road. The transmission controller performs the transmission control on the basis of the transmission characteristic selected by the transmission-characteristic selecting device.

The uphill determination device calculates the corrected uphill determination value by subjecting the uphill determination value to the moderating calculation using a moderating coefficient, and updates the moderating coefficient in accordance with the corrected uphill determination value. Therefore, in the case where the vehicle climbs an uphill with a load that exceeds the standard carrying capacity, even if the driver releases the accelerator pedal and the uphill determination value decreases, the degree of reduction in the uphill determination value can be moderated and smoothed. Therefore, when the transmission-characteristic selecting device selects one of the transmission characteristics on the basis of the corrected uphill determination value, a transmission characteristic for a gentle uphill is not easily selected. As a result, even when the driver releases the accelerator pedal, the shift-busy state, which causes the driver to experience an uncomfortable feeling, does not easily occur.

In addition, since the occurrence of the shift-busy state can be suppressed simply by performing the moderating calculation of the uphill determination value without using an inclination sensor or a weight sensor, costs are not increased. The correction of the uphill determination value is performed when the inclination is higher than or equal to a predetermined value. Therefore, the shift-changing operation is not affected when the vehicle is driving on a flat road or a gentle uphill. In addition, since the use of the corrected uphill determination value is limited to a high-load range, uncomfortable feeling experienced by the driver can be minimized even when there is a slight delay in switching between the transmission characteristics because of the moderating calculation.

Obviously, numerous modifications and variations of the present invention are possible in light of the above teachings.

It is therefore to be understood that within the scope of the appended claims, the invention may be practiced otherwise than as specifically described herein.

What is claimed is:

1. A vehicle transmission control apparatus comprising:
an expected-acceleration calculator configured to calculate an expected acceleration of a vehicle based on at least an engine load and a vehicle speed;
an actual-acceleration calculator configured to calculate an actual acceleration of the vehicle;
an uphill determination device configured to calculate an uphill determination value based on a difference between the expected acceleration and the actual acceleration and configured to calculate a current value of a corrected uphill determination value by subjecting the uphill determination value to moderating calculation using a moderating coefficient and a previous value of the corrected uphill determination value, the uphill determination device being configured to update the corrected uphill determination value in accordance with the moderating coefficient, the uphill determination value serving as an index for determining whether or not the vehicle is climbing an uphill, the uphill determination device selecting a first moderating coefficient as the moderating coefficient when the previous value of the corrected uphill determination value is equal to or larger than a predetermined threshold, the first moderating coefficient being larger than 0 and smaller than 1, the uphill determination device selecting a second moderating coefficient as the moderating coefficient when the previous value of the corrected uphill determination value is smaller than the predetermined threshold, the second moderating coefficient being larger than 0 and smaller than 1, the second moderating coefficient being larger than the first moderating coefficient, the uphill determination device being configured to calculate the current value of the corrected uphill determination value based on a following equation to update the corrected uphill determination value, $$PNOAVA1 = K \times PNO + (1-K) \times PNOAVA2$$

where "PNOAVA1" is the current value of the corrected uphill determination value, "K" is the moderating coefficient selected by the uphill determination device, "PNO" is the uphill determination value, and "PNOAVA2" is the previous value of the corrected uphill determination value;
a transmission-characteristic selecting device configured to select one of a plurality of transmission characteristics based on the corrected uphill determination value, the transmission characteristics including at least a transmission characteristic for climbing an uphill and a transmission characteristic for driving on a flat road; and
a transmission controller configured to perform transmission control based on the transmission characteristic selected by the transmission-characteristic selecting device.

2. The vehicle transmission control apparatus according to claim 1,
wherein the uphill determination device respectively sets an initial moderating coefficient and an initial value of the corrected uphill determination value as the moderating coefficient and the previous value of the corrected uphill determination value when the moderating coefficient is not selected yet.

3. A vehicle transmission control apparatus comprising:
expected-acceleration calculating means for calculating an expected acceleration of a vehicle based on at least an engine load and a vehicle speed;
actual-acceleration calculating means for calculating an actual acceleration of the vehicle;
uphill determining means for calculating an uphill determination value based on a difference between the expected acceleration and the actual acceleration and for calculating a current value of a corrected uphill determination value by subjecting the uphill determination value to moderating calculation using a moderating coefficient and a previous value of the corrected uphill determination value, the uphill determination device being for updating the corrected uphill determination value in accordance with the moderating coefficient, the uphill determination value serving as an index for determining whether or not the vehicle is climbing an uphill, the uphill determining means selecting a first moderating coefficient as the moderating coefficient when the previous value of the corrected uphill determination value is equal to or larger than a predetermined threshold, the first moderating coefficient being larger than 0 and smaller than 1, the uphill determining means selecting a second moderating coefficient as the moderating coefficient when the previous value of the corrected uphill determination value is smaller than the predetermined threshold, the second moderating coefficient being larger than 0 and smaller than 1, the second moderating coefficient being larger than the first moderating coefficient, the uphill determining means being for calculating the current value of the corrected uphill determination value based on a following equation to update the corrected uphill determination value, $$PNOAVA1 = K \times PNO + (1-K) \times PNOAVA2$$

where "PNOAVA1" is the current value of the corrected uphill determination value, "K" is the moderating coefficient selected by the uphill determining means, "PNO" is the uphill determination value, and "PNOAVA2" is the previous value of the corrected uphill determination value;
transmission-characteristic selecting means for selecting one of a plurality of transmission characteristics based on the corrected uphill determination value, the transmission characteristics including at least a transmission characteristic for climbing an uphill and a transmission characteristic for driving on a flat road; and
transmission controlling means for performing transmission control based on the transmission characteristic selected by the transmission-characteristic selecting means.

4. The vehicle transmission control apparatus according to claim 3,
wherein the uphill determining means respectively sets an initial moderating coefficient and an initial value of the corrected uphill determination value as the moderating coefficient and the previous value of the corrected uphill determination value when the moderating coefficient is not selected yet.

\* \* \* \* \*